United States Patent
Shekhawat et al.

(10) Patent No.: US 8,942,019 B2
(45) Date of Patent: Jan. 27, 2015

(54) CURRENT VECTOR CONTROLLED DEADTIME FOR MULTILEVEL INVERTERS

(75) Inventors: Sampat Shekhawat, Mountain Top, PA (US); Myoungho Lee, Bucheon (KR); Yongtaek Lee, Gimpo (KR); Jacobo Aguillon-Garcia, Bucheon (KR); Bongjoo Choi, Bucheon (KR)

(73) Assignee: Fairchild Korea Semiconductor Ltd., Bucheon (KR)

( * ) Notice: Subject to any disclaimer, the term of this patent is extended or adjusted under 35 U.S.C. 154(b) by 334 days.

(21) Appl. No.: 13/286,430

(22) Filed: Nov. 1, 2011

(65) Prior Publication Data
US 2013/0107599 A1    May 2, 2013

(51) Int. Cl.
*H02M 7/5387* (2007.01)
*H02M 7/487* (2007.01)
*H02M 7/537* (2006.01)
*H02M 1/00* (2006.01)

(52) U.S. Cl.
CPC ........ *H02M 7/487* (2013.01); *H02M 2001/007* (2013.01)
USPC .......................................... 363/132; 363/131

(58) Field of Classification Search
USPC .................................. 363/131–132
See application file for complete search history.

(56) References Cited

U.S. PATENT DOCUMENTS

| | | | | |
|---|---|---|---|---|
| 4,961,129 A | * | 10/1990 | Shekhawat | 363/40 |
| 5,120,986 A | | 6/1992 | Shekhawat | |
| 7,760,527 B2 | * | 7/2010 | Baudesson et al. | 363/98 |
| 7,868,597 B2 | * | 1/2011 | Dequina | 323/222 |
| 8,385,092 B1 | * | 2/2013 | Shekhawat | 363/56.04 |
| 2004/0267468 A1 | * | 12/2004 | Leuthen et al. | 702/64 |

OTHER PUBLICATIONS

Jose Rodriguez et al., "Multilevel Inverters: A Survey of Topologies, Controls, and Applications", Aug. 2002, pp. 724-738, IEEE Transactions on Industrial Electronics, vol. 49, No. 4.
Clark Hochgraf et al., "Comparison of Multilevel Inverters for Static Var Compensation", Sep. 1994, 9 pages, Research Report 94-96, University of Wisconsin—Madison College of Engineering, Madison, WI.

* cited by examiner

*Primary Examiner* — Adolf Berhane
*Assistant Examiner* — Henry Lee, III
(74) *Attorney, Agent, or Firm* — Okamoto & Benedicto LLP

(57) ABSTRACT

A multilevel inverter circuit includes an inverter control circuit that controls switching of main and neutral switches. The inverter control circuit receives current vector information indicating flow direction of an AC current output of the multilevel inverter circuit. The inverter control circuit eliminates dead time between switching of a neutral switch and a main switch depending on whether the AC current output is flowing towards a load or away from the load. Among other advantages, elimination of dead time improves the total harmonic distortion of the sinusoidal AC voltage output of the multilevel inverter circuit.

20 Claims, 8 Drawing Sheets

US 8,942,019 B2

CURRENT VECTOR CONTROLLED DEADTIME FOR MULTILEVEL INVERTERS

BACKGROUND OF THE INVENTION

1. Field of the Invention

The present invention relates generally to electrical circuits, and more particularly but not exclusively to multilevel inverters.

2. Description of the Background Art

Inverters are electrical circuits that convert direct current (DC) to alternating current (AC). Inverters are employed in various applications including motor control and solar cells, to name some examples.

Multilevel inverters may comprise switches, such as power transistors, and capacitor voltage sources. The switching action of the transistors presents a voltage of one of the capacitor voltage sources to the output. Multilevel inverters generate an output voltage with three or more levels, such as positive, neutral, and minus. The transistors being modulated are synchronized with a dead time to prevent inadvertent conduction or short circuit. Embodiments of the present invention provide inverter topologies and control schemes with current vector controlled dead time for improved total harmonic distortion.

SUMMARY

In one embodiment, a method of operating a multilevel inverter circuit includes modulating a first main switch and a first neutral switch during generation of a positive half cycle of an output of the multilevel inverter circuit, the first main switch switching on and off to connect and disconnect an output node of the multilevel inverter circuit to a positive node, the first neutral switch switching on and off to connect and disconnect the output node of the multilevel inverter circuit to a neutral potential. A flow direction of alternating current (AC) current output of the multilevel inverter circuit is detected. In response to detecting that the AC current output of the multilevel inverter is flowing in a positive direction towards a load, dead time between switching of the first neutral switch and the first main switch is eliminated during the generation of the positive half cycle of the output of the multilevel inverter circuit.

In another embodiment, a method of operating a multilevel inverter circuit includes generating a first half cycle of an alternating current (AC) voltage output of the multilevel inverter circuit. A flow direction of AC current output of the multilevel inverter circuit is detected. Dead time between switching of a first neutral switch and a first main switch of the multilevel inverter circuit is eliminated during generation of the first half cycle of the AC voltage output based on the flow direction of the AC current output of the multilevel inverter circuit.

In another embodiment, a multilevel inverter circuit comprises (a) a main positive switch coupled to a positive voltage source, (b) a main minus switch coupled to a negative voltage source, (c) a neutral positive switch coupled to a neutral potential and the main positive switch, (d) a neutral minus switch coupled to the neutral potential and the main minus switch, and (e) an inverter control circuit having control outputs coupled to the main positive switch, the main minus switch, the neutral positive switch, and the neutral minus switch and having an input coupled to receive current vector information indicating direction of flow of an AC current output of the multilevel inverter circuit, the inverter control circuit being configured to remove dead time between switching of the neutral minus switch and the main positive switch and between switching of the neutral positive switch and the main minus switch based on the current vector information.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
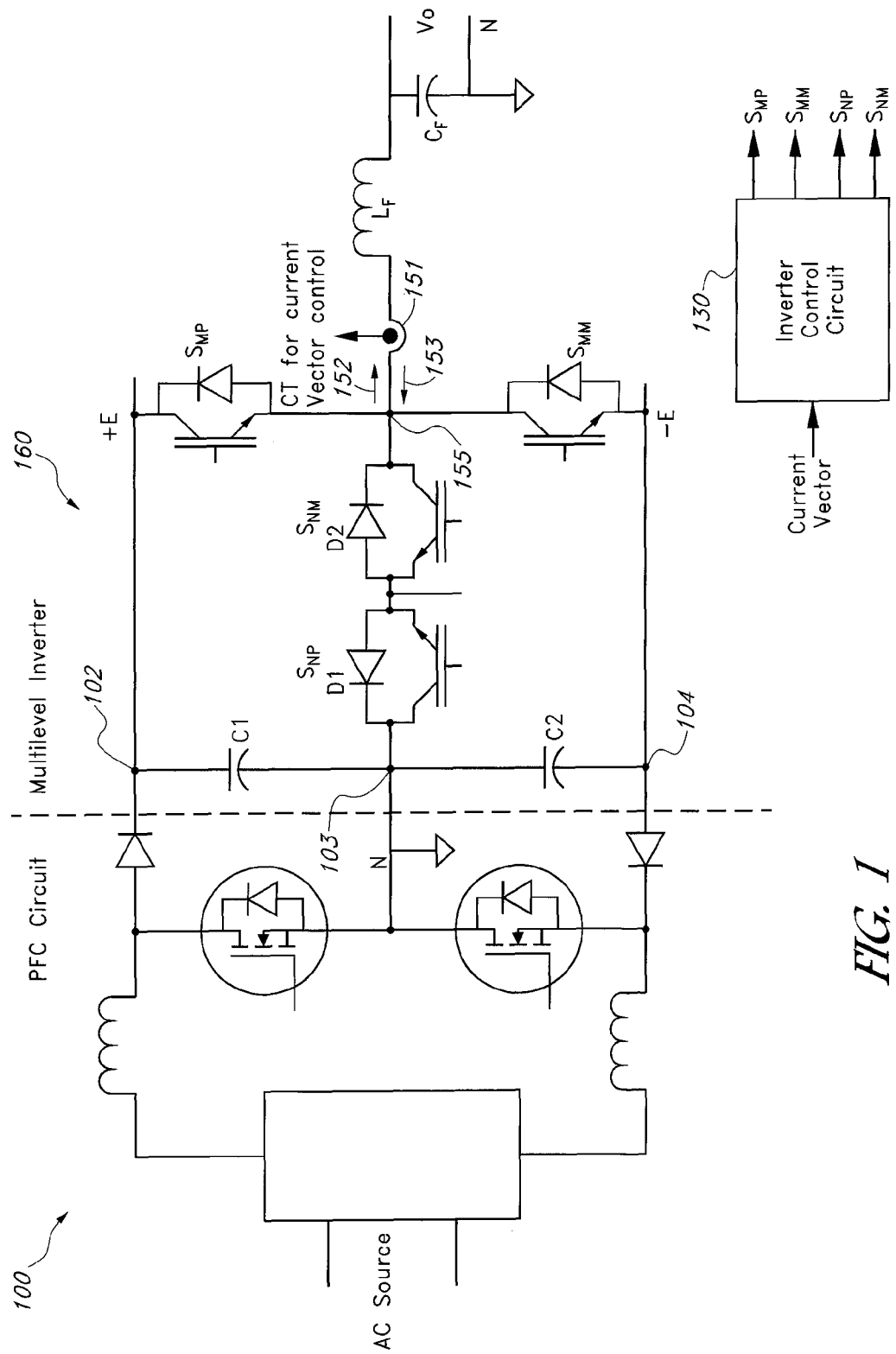
FIG. 1 is a schematic diagram of an electrical circuit with a multilevel inverter circuit in accordance with an embodiment of the present invention.

FIG. 1 is a schematic diagram of an electrical circuit with a multilevel inverter circuit 160 in accordance with an embodiment of the present invention. The multilevel inverter circuit 160 converts DC voltage from capacitors C1 and C2 to a sinusoidal AC voltage output Vo across a capacitor $C_F$. In the example of FIG. 1, the multilevel inverter circuit 160 is coupled to a power factor correction (PFC) circuit 100. The PFC circuit 100 is coupled to an AC source (e.g., AC electrical outlet) to charge the capacitors C1 and C2, which serve as DC voltage sources. The operation of PFC circuits, including the PFC circuit 100, in general are known in the art and is thus not further described here.

It should be noted that the multilevel inverter circuit 160 may be coupled to other electrical circuits, instead of a PFC circuit, to receive DC voltage sources. For example, the multilevel inverter circuit 160 may be coupled to receive DC voltages from a plurality of solar cells in a photovoltaic power plant. In particular, in one embodiment, the multilevel inverter circuit 160 receives a positive voltage source on a positive node 102, a negative voltage source on a minus node 104, and a neutral potential on a neutral node 103 from solar cells.

In the example of FIG. 1, the multilevel inverter circuit 160 comprises the capacitors C1 and C2, switches SNP ("$S_{NP}$"), SNM ("$S_{NM}$"), SMP ("$S_{MP}$"), and SMM ("$S_{MM}$"), diodes D1 and D2, a current transformer 151, an output inductor $L_F$, an output capacitor $C_F$, and an inverter control circuit 130.

The inverter control circuit 130 comprises an electrical circuit that generates control pulses for switching the switches SNP, SNM, SMP, and SMM on and off to generate the sinusoidal AC voltage output Vo. In one embodiment, the inverter control circuit 130 is electrically coupled to the current transformer 151 to receive current vector information from the current transformer 151. The current vector information indicates whether the AC current output of the multilevel inverter circuit 160 is going in a positive direction (see arrow 152) towards the load or in a negative direction away from the load towards the inverter (see arrow 153). As will be more apparent below, the multilevel inverter control circuit 160 is configured to eliminate switching dead time based on the current vector information.

The control pulses, which are also referred to as "gate pulses", generated by the inverter control circuit 130 are applied to the control element of the corresponding switch to turn that switch on or off. The control element may be a base, gate, or other terminal depending on the type and configuration of the transistor (or other switching device) being used as the switch. In the example of FIG. 1, the switches SNP, SNM, SMP, and SMM comprise NPN bipolar junction transistors (BJT) and the control pulses generated by the inverter control circuit 130 are applied to the base of corresponding transistors. In applications where one or more of the switches SNP, SNM, SMP, and SMM are metal oxide semiconductor (MOS) transistors, control pulses generated by the inverter control circuit 130 are applied to the gate of corresponding transistors.

In the example of FIG. 1, the switches SMP and SMM are the main positive (MP) and main minus (MM) switches, respectively. Similarly, the switches SNP is the neutral positive (NP) switch and the switch SNM is the neutral minus (NM) switch. The inverter circuit 160 is "multilevel" in that it generates a discrete output with three different levels at a discrete output node 155 namely, neutral, positive voltage, and negative voltage. In the example of FIG. 1, the capacitors C1 and C2 serve as DC voltage sources that provide a positive voltage ("+E") on the positive node 102, a neutral potential ("N") on the neutral node 103, and a negative voltage ("−E") on the minus node 104. The multilevel voltages on the discrete output node 155 are smoothed by the filter network formed by the inductor $L_F$ and capacitor $C_F$ to generate a sinusoidal AC voltage output Vo provided to a load.

In the example of FIG. 1, a first terminal of the capacitor C1 is connected to the minus node 102 and a second terminal of the capacitor C1 is connected to the neutral node 103. A first terminal of the capacitor C2 is connected to the neutral node 103 with the second terminal of the capacitor C1, and a second terminal of the capacitor C2 is connected to the minus node 104. A first terminal of the switch SNP is connected to the neutral node 103, and a second terminal of the switch SNP is connected to a first terminal of the switch SNM. A second terminal of the switch SNM is connected to the discrete output node 155. The diode D1 is across the switch SNP and the diode D2 is across the switch SNM. A first terminal of the switch SMP is connected to the positive node 102, and a second terminal of the switch SMP is connected to the discrete output node 155. A first terminal of the switch SMM is connected to the minus node 104, and a second terminal of the switch SMM is connected to the discrete output node 155 with the second terminal of the switch SMP. The current transformer 151 is coupled in-line with the AC current output of the multilevel inverter circuit 160 to the inductor $L_F$. A first terminal of the inductor $L_F$ is connected to the discrete output node 155 and a second terminal of the inductor $L_F$ is connected to a first terminal of the capacitor $C_F$. A second terminal of the capacitor $C_F$ is connected to the neutral node 103. The AC voltage output Vo is taken at the node connecting the second terminal of the inductor $L_F$ to the first terminal of the capacitor $C_F$.

The switches SMP and SMM are the main switches in that they connect the positive voltage +E and negative voltage −E, respectively, to the discrete output node 155. Similarly, the switches SNP and SNM are the neutral switches in that they connect the neutral potential N to the discrete output node 155. In the topology of the multilevel inverter circuit 160, the neutral switches SNP and SNM are in series between the neutral node 103 and the discrete output node 155.

Figure 2:
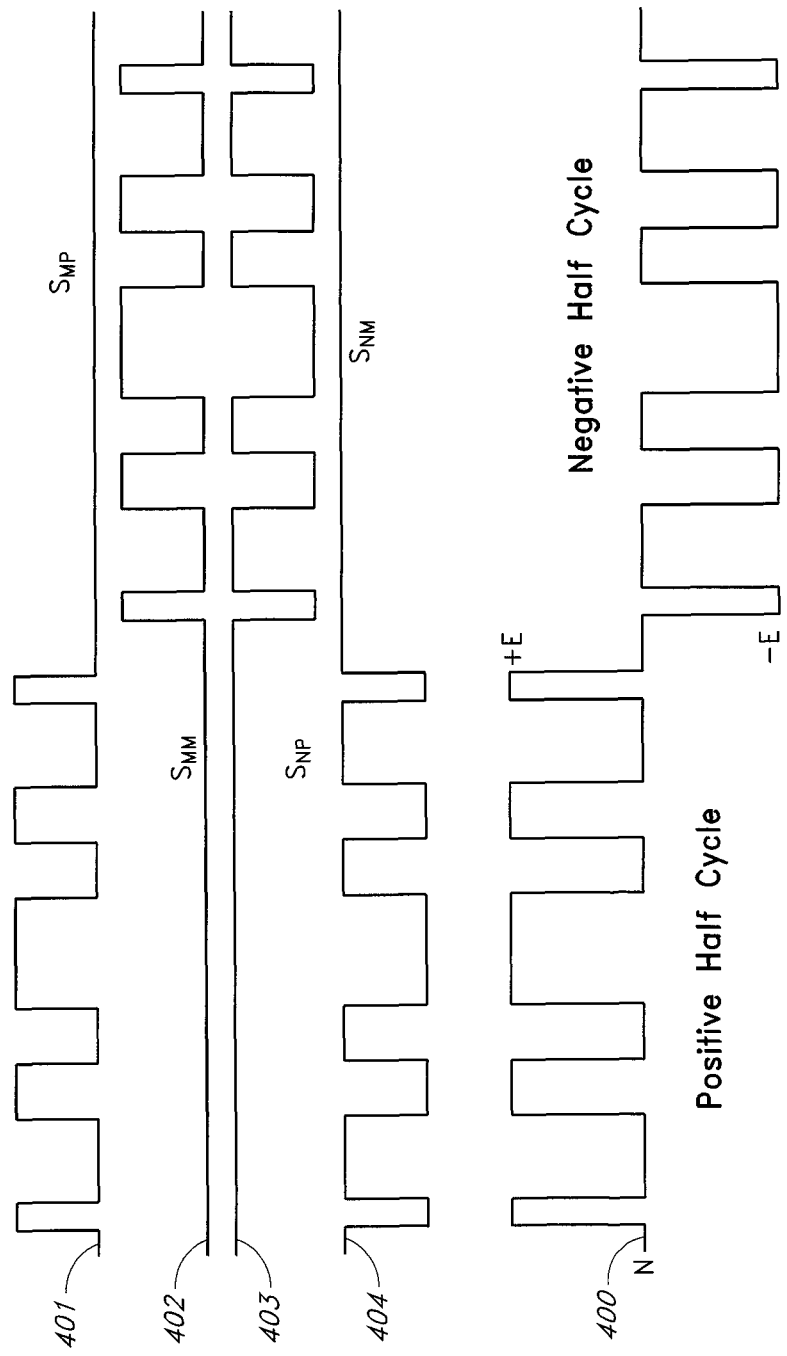
FIG. 2 is a timing diagram showing waveforms of ideal control pulses of a multilevel inverter circuit in accordance with an embodiment of the present invention.

The operation of the electrical circuit of FIG. 1 is now explained with reference to the timing diagram of FIG. 2. FIG. 2 shows the waveforms of ideal control pulses 401-404 that are generated by the inverter control circuit 130 to control the operation of the multilevel inverter circuit 160 in accordance with an embodiment of the present invention. Throughout this disclosure, a high level control pulse turns a corresponding switch on, and a low level control pulse turns the corresponding switch off. As can be appreciated, the level for turning a switch on or off depends on the switch and its configuration. The control pulses 401-404 control the switching of the switches SMP, SMM, SNP, and SNM, respectively. To simplify illustration, the control pulses 401-404 are "ideal control pulses" in that they do not have dead time between switching.

FIG. 2 also shows the waveform of the discrete output 400 at the discrete output node 155. To generate the positive half cycle of the discrete output 400, the switch SMM (see control pulses 402) is turned off, the switch SNP (see control pulses 403) is turned on, and the switches SMP (see control pulses 401) and SNM (see control pulses 404) are modulated on and off, e.g., by pulse width modulation (PWM) or other control scheme. During generation of the positive half cycle of the discrete output 400, turning the switch SMP on and the switch SNM off allows electrical current to flow in a positive direction towards the load (see arrow 152) to generate the positive voltage output +E. The diode D1 prevents reverse current flow. Also during generation of the positive half cycle of the discrete output 400, turning the switch SMP off and the switch SNM on couples the neutral potential at the node 103 to the discrete output node 155, resulting in the discrete output 400 being at the neutral potential N.

To generate the negative half cycle of the discrete output 400, the switch SMP is turned off, the switch SNM is turned on, and the switches SMM and SNP are modulated on and off, e.g., by PWM. During generation of the negative half cycle of the discrete output 400, turning the switch SMM on and the switch SNP off allows electrical current to flow in a negative direction away from the load and towards the multilevel inverter circuit 160 (see arrow 153) to generate the negative voltage output −E. The diode D2 prevents reverse current flow. Also during generation of the negative half cycle of the discrete output 400, turning the switch SMM off and the switch SNP on couples the neutral potential at the node 103 to the discrete output node 155, resulting in the discrete output 400 being at the neutral potential N.

The discrete output 400 is input to the filter network formed by the inductor $L_F$ and the capacitor $C_F$ to generate the sinusoidal AC voltage output Vo. As can be appreciated, generation of the positive half cycle of the discrete output 400 corresponds to generation of the positive half cycle of the sinusoidal AC voltage output Vo. Similarly, generation of the negative half cycle of the discrete output 400 corresponds to generation of the negative half cycle of the sinusoidal AC voltage output Vo. Accordingly, unless specifically noted, the "inverter output" refers to either the discrete output or the sinusoidal AC voltage output of the inverter.

Figure 3:
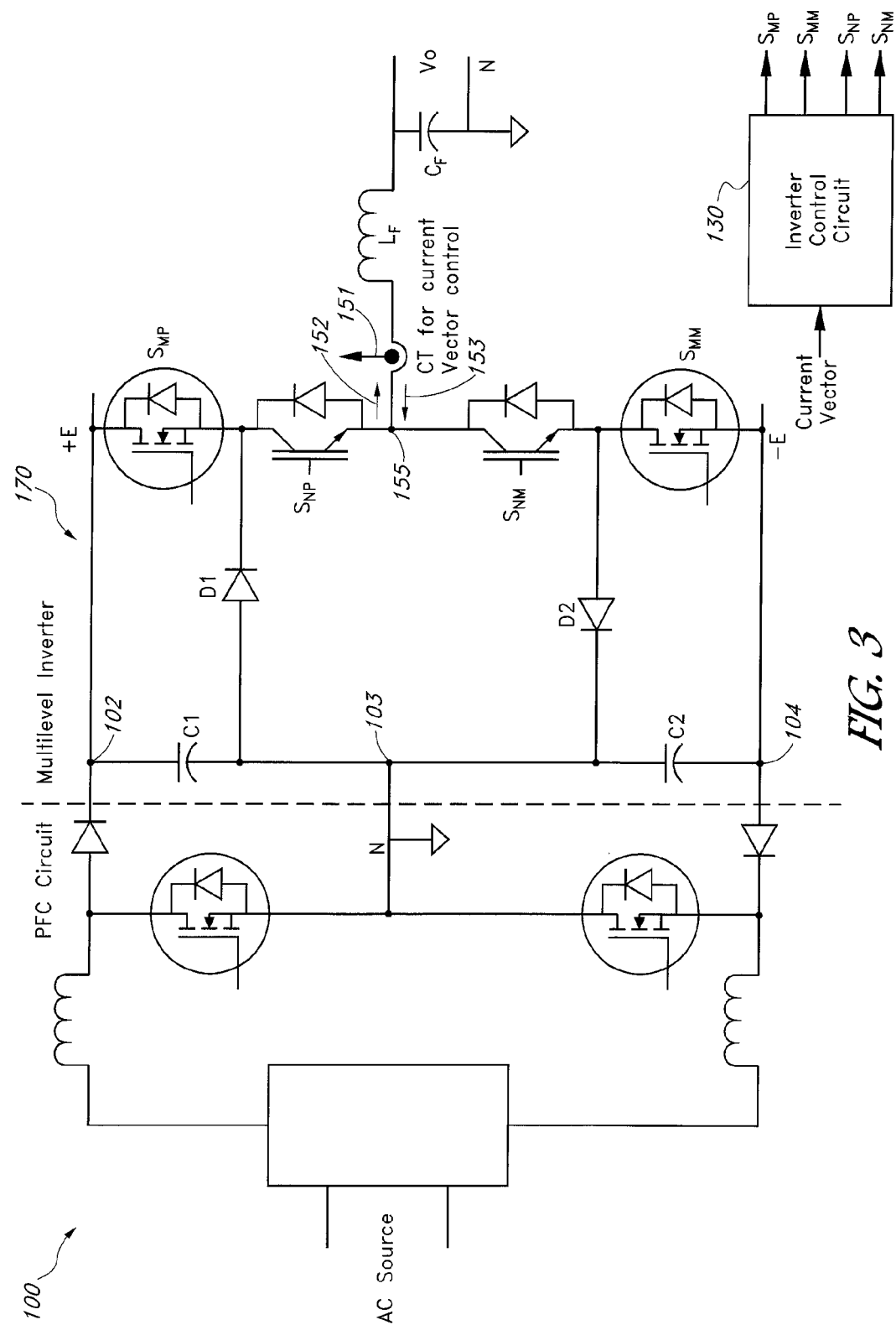
FIG. 3 is a schematic diagram of an electrical circuit with a multilevel inverter circuit in accordance with another embodiment of the present invention.

FIG. 3 shows an electrical circuit with a multilevel inverter circuit 170 in accordance with an embodiment of the present invention. In the example of FIG. 3, a first terminal of the capacitor C1 is connected to the positive node 102 and a second terminal of the capacitor C1 is connected to the neutral node 103. A first terminal of the capacitor C2 is connected to the neutral node 103 with the second terminal of the capacitor C1, and a second terminal of the capacitor C2 is connected to the minus node 104. A first terminal of the switch SMP is connected to the positive node 102, and a second terminal of the switch SMP is connected to a first terminal of the switch SNP. A second terminal of the switch SNP is connected to the discrete output node 155. The diode D1 connects the neutral node 103 to the second terminal of the switch SMP and the first terminal of the switch SNP. A first terminal of the switch SMM is connected to the minus node 104, and a second terminal of the switch SMM is connected to a first terminal of the switch SNM. A second terminal of the switch SNM is connected to the discrete output node 155. The diode D2 connects the neutral node 103 to the second terminal of the switch SMM and the first terminal of the switch SNM. The current transformer 151 is coupled in-line with the AC current output of the multilevel inverter circuit 170 to the inductor $L_F$. A first terminal of the inductor $L_F$ is connected to the discrete output node 155 and a second terminal of the inductor $L_F$ is connected to a first terminal of the capacitor $C_F$. A second terminal of the capacitor $C_F$ is connected to the neutral node 103. The AC voltage output Vo is taken at the node connecting the second terminal of the inductor $L_F$ to the first terminal of the capacitor $C_F$.

The multilevel circuit 170 has the same components and operates in a similar manner as the multilevel inverter circuit 160 of FIG. 1. The difference is that in the topology of the multilevel inverter circuit 170, the neutral positive switch SNP is in-line with the main positive switch SMP, and the neutral minus switch SNM is in-line with the main minus switch SMM. Also, the main switches SMP and SMM are MOS transistors in the multilevel inverter circuit 170. As can be appreciated, the choice of switching element and topology will depend on the application and design trade offs. The components and nodes of the electrical circuit of FIG. 3 are otherwise as explained with reference to the electrical circuit of FIG. 1. Accordingly, the control pulses of FIG. 2 equally apply to the multilevel inverter circuit 170.

As can be appreciated, dead time is typically needed in a practical circuit to prevent inadvertent conduction or short circuit. In the case of multilevel inverter circuits, dead time is typically inserted between switching of a main switch and a corresponding neutral switch being modulated together with the main switch. As a particular example, in modulating the switches SMP and SNM to generate discrete outputs that go between the positive voltage +E and the neutral potential N to generate the positive half cycle of the inverter output, there is a period where the switches SMP and SNM are both off before the other switch (i.e., either SMP or SNM) is turned on. The same is true in modulating the switches SMM and SNP to generate discrete outputs that go between the negative voltage −E and the neutral potential N to generate the negative half cycle of the inverter output. This period of time where both switches being modulated or alternately switched are turned off in a switching transition is the dead time.

Figure 4:
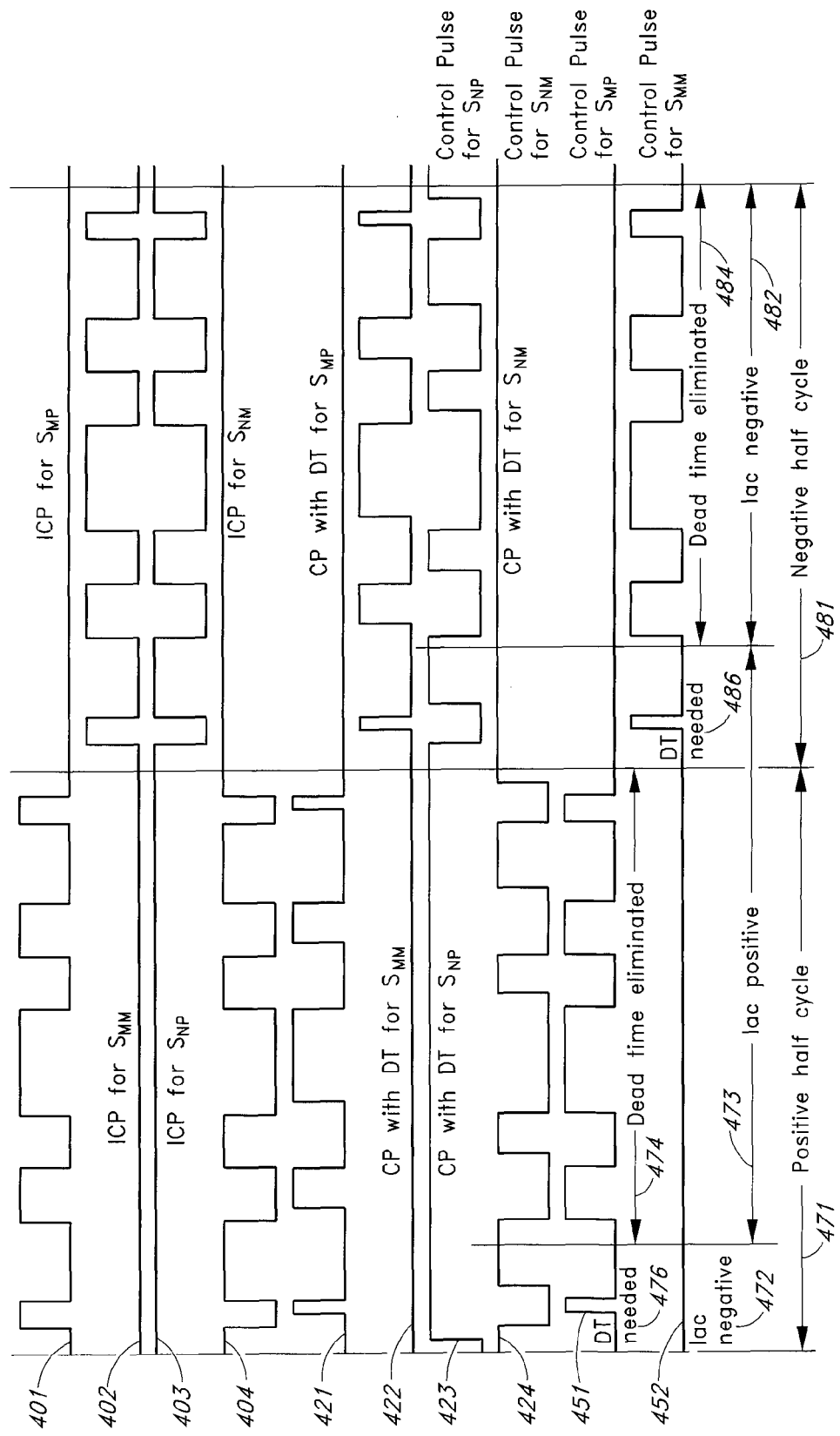
FIG. 4 shows a timing diagram illustrating current vector controlled dead time in accordance with an embodiment of the present invention.

FIG. 4 shows a timing diagram illustrating current vector controlled dead time in accordance with an embodiment of the present invention. In the example of FIG. 4, the waveforms 401-404 are the same as in FIG. 2 and represent ideal control pulses (ICP) for switches SMP, SMM, SNP, and SNM, respectively. The control pulses 401-404 are ideal in that they do not include dead time between switching transitions.

In the example of FIG. 4, control pulses 421-424 show control pulses for switching the switches SMP, SMM, SNP, and SNM with dead time. Referring to the control pulses 421 and 424, the switch SMP is alternately switched with the switch SNM during the positive half cycle (see arrow 471) of the inverter output. There is dead time (DT) between the turning off of the switch SNM and the turning on of the switch SMP, and vice versa. That is, there is a dead time after the switch SNM is turned off before the switch SMP is turned on, and also after the switch SMP is turned off before the switch SNM is turned on. The dead time prevents the switches SNM and SMP from being on at the same time. Similarly, the switch SMM is alternately switched with the switch SNP during the negative half cycle (see arrow 481) of the inverter output. There is dead time between turning off of the switch SNP and turning on of the switch SMM, and vice versa. The dead time prevents the switches SNP and SMM from being on at the same time. Simulations conducted by the inventors indicate that dead time worsens the total harmonic distortion (THD) of the sinusoidal AC voltage output Vo.

In one embodiment, the inverter control circuit 130 is configured to eliminate or adjust dead time between switching transitions of a main switch and a neutral switch being modulated together based on current vector. In one embodiment, the inverter control circuit 130 is configured to remove dead time between switching transitions during a period when the AC current output of the inverter is flowing in a direction that has the same polarity as the AC voltage output Vo of the inverter. More specifically, the inverter control circuit 130 is configured to eliminate dead time between switching transitions of the main positive switch SMP and the neutral minus switch SNM being modulated together with the main positive switch SMP during a period 474 when the current vector information from the current transformer 151 indicates that the AC current output of the inverter is flowing in a positive direction (see 473; see also arrow 152 of FIG. 1) towards the load during generation of the positive half cycle of the inverter output. Similarly, the inverter control circuit 130 is configured to eliminate dead time between switching transitions of the main minus switch SMM and the neutral positive switch SNP being modulated together with the main minus switch SMM during a period 484 when the current vector information from the current transformer 151 indicates that the AC current output of the inverter is flowing in a negative direction (see 482; see also arrow 153 of FIG. 1) away from the load and towards the inverter during the negative half cycle of the inverter output (arrow 481).

The periods where dead time is eliminated by the inverter control circuit 130 are indicated by the arrow 474 during the positive half cycle of the inverter output and by the arrow 484 during the negative half cycle of the inverter output. During these periods where dead time is eliminated, the corresponding main switch, i.e., the switch SMP during the positive half cycle of the inverter output or the switch SMM during the negative half cycle of the inverter output, is switched on without having to wait for the corresponding neutral switch to be off. For example, the main switch may be turned on at the same time the corresponding neutral switch is being turned off. In that case, the lower and rising edges of the control pulses of the main and neutral switches may occur at the same time, and there may be a brief moment of time where both the main and neutral switches are both on. But in that moment, the forward voltage drops of the diode D1 and the neutral positive switch SNP will reverse bias the diode D2 to prevent a shoot through situation.

In the example of FIG. 4, during the period 474 when the inverter control circuit 130 eliminates the dead time, the main positive switch SMP is turned on without first waiting for the neutral minus switch SNM to turn off. This is shown by the control pulses 451 during the period 474, where the switch SMP is turned on with a control pulse that has a rising edge occurring at the same time as the falling edge of the control pulse to turn off the neutral switch SNM (compare control pulses 451 to 424 during the period 474). Note that the inverter control circuit 130 keeps a dead time during the period 476 when the AC current output of the inverter is flowing in the negative direction (see 472) and the output of the inverter is in the positive half cycle. In that period 476, the inverter control circuit 130 inserts a dead time between the turning off of the neutral minus switch SNM and the turning on of the main positive switch SMP, and vice versa.

Similarly, during the period 484 when the inverter control circuit 130 eliminates the dead time, the main minus switch SMM is turned on without first waiting for the neutral positive switch SNP to turn off. This is shown by the control pulses 452 during the period 484, where the switch SMM is turned on with a control pulse that has a rising edge occurring at the same time as the falling edge of the control pulse to turn off the neutral switch SNP (compare control pulses 452 to 423 during the period 484). The inverter control circuit 130 inserts a dead time during the period 486 when the AC current output of the inverter is flowing in the positive direction (see 473) and the output of the inverter is in the negative half cycle. In that period 486, the inverter control circuit 130 inserts a dead time between the turning off of the neutral switch SNP and the turning on of the main minus switch SMM, and vice versa.

Figure 5:
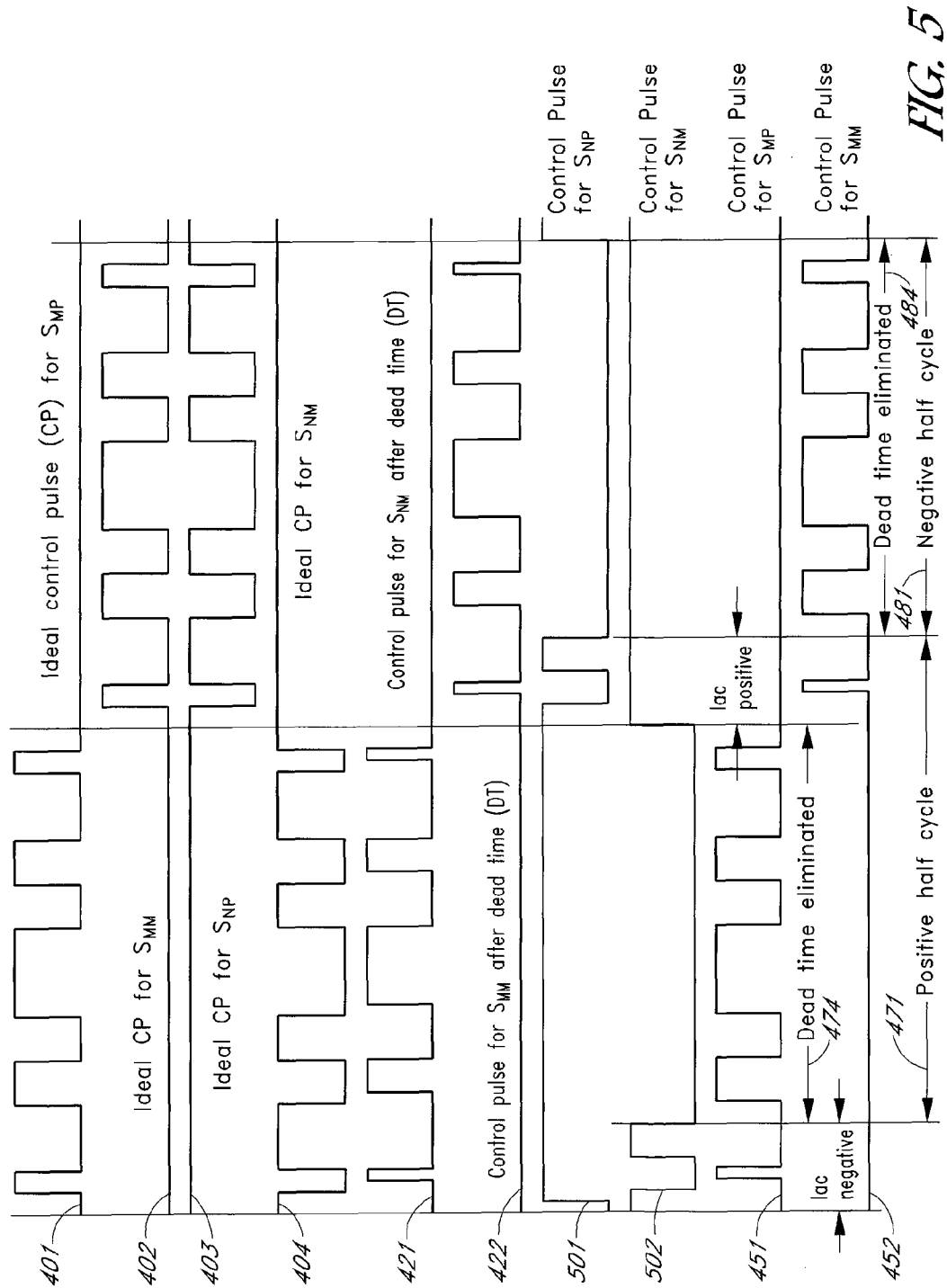
FIG. 5 shows a timing diagram illustrating current vector controlled dead time in accordance with another embodiment of the present invention.

During the periods 474 and 484 when dead time is eliminated, there is not enough potential on the discrete output node 155 to allow current flow in the wrong direction. A neutral switch may thus be continuously turned off instead of modulated with a corresponding main switch during these periods. This is shown by the control pulses 501 and 502 in the timing diagram of FIG. 5. During the period 474 where dead time is eliminated during the positive half cycle (see 471 of FIG. 5) of the inverter output, the inverter control circuit 130 continuously turns off the neutral minus switch SNM as shown by the control pulses 502. Similarly, during the period 484 where dead time is eliminated during the negative half cycle (see 481 of FIG. 5) of the inverter output, the inverter control circuit 130 continuously turns off the neutral positive switch SNP as shown by the control pulses 501. The control pulses 401-404, 421, 422, 451, and 452 in the timing diagram of FIG. 5 is otherwise the same as in FIG. 4.

The inverter control circuit 130 may be implemented using analog, digital, or a combination of analog and digital circuitry to control a multilevel inverter (e.g., 160 and 170) to adjust or eliminate dead time as previously discussed with reference to the timing diagrams of FIGS. 2, 4, and 5. For example, with reference to the timing diagram of FIG. 4, the inverter control circuit 130 may be configured to generate the control pulses 424 and 451 in modulating the neutral minus switch SNM and the main positive switch SMP, and the control pulses 423 and 452 in modulating the neutral positive switch SNP and the main minus switch SMM. As another example, with reference to the timing diagram of FIG. 5, the inverter control circuit 130 may be configured to generate the control pulses 502 and 451 in modulating the neutral minus switch SNM and the main positive switch SMP, and the control pulses 501 and 452 in modulating the neutral positive switch SNP and the main minus switch SMM.

In general, the inverter control circuit 130 may be configured to receive current vector information from the current transformer 151 to determine the direction of the AC current output of the inverter. When the inverter control circuit 130 detects that the AC current output of the inverter is flowing in a positive direction towards the load, i.e., towards the AC voltage output Vo, and the inverter is generating the positive half cycle of the AC voltage output Vo, the inverter control circuit 130 is configured to eliminate dead time between the turning off of the neutral minus switch and the turning on of the main positive switch, and vice versa. In that case, the inverter control circuit 130 may turn on the main positive switch at the same time the neutral minus switch has turned off. The inverter control circuit 130 continues to add dead time between switching transitions of the main positive switch and the neutral minus switch at other times during the generation of the positive half cycle of the AC voltage output Vo.

When the inverter control circuit 130 detects that the AC current output of the inverter is flowing in a negative direction away from the load, i.e., towards the inverter, and the inverter is generating the negative half cycle of the AC voltage output Vo, the inverter control circuit 130 is configured to eliminate dead time between the turning off of the neutral positive switch and the turning on of the main minus switch, and vice versa. In that case, the inverter control circuit 130 may turn on the main minus switch at the same time, the neutral positive switch has turned off. The inverter control circuit 130 continues to add dead time between switching transitions of the main minus switch and the neutral positive switch at other times during the generation of the negative half cycle of the AC voltage output Vo.

Figure 6:
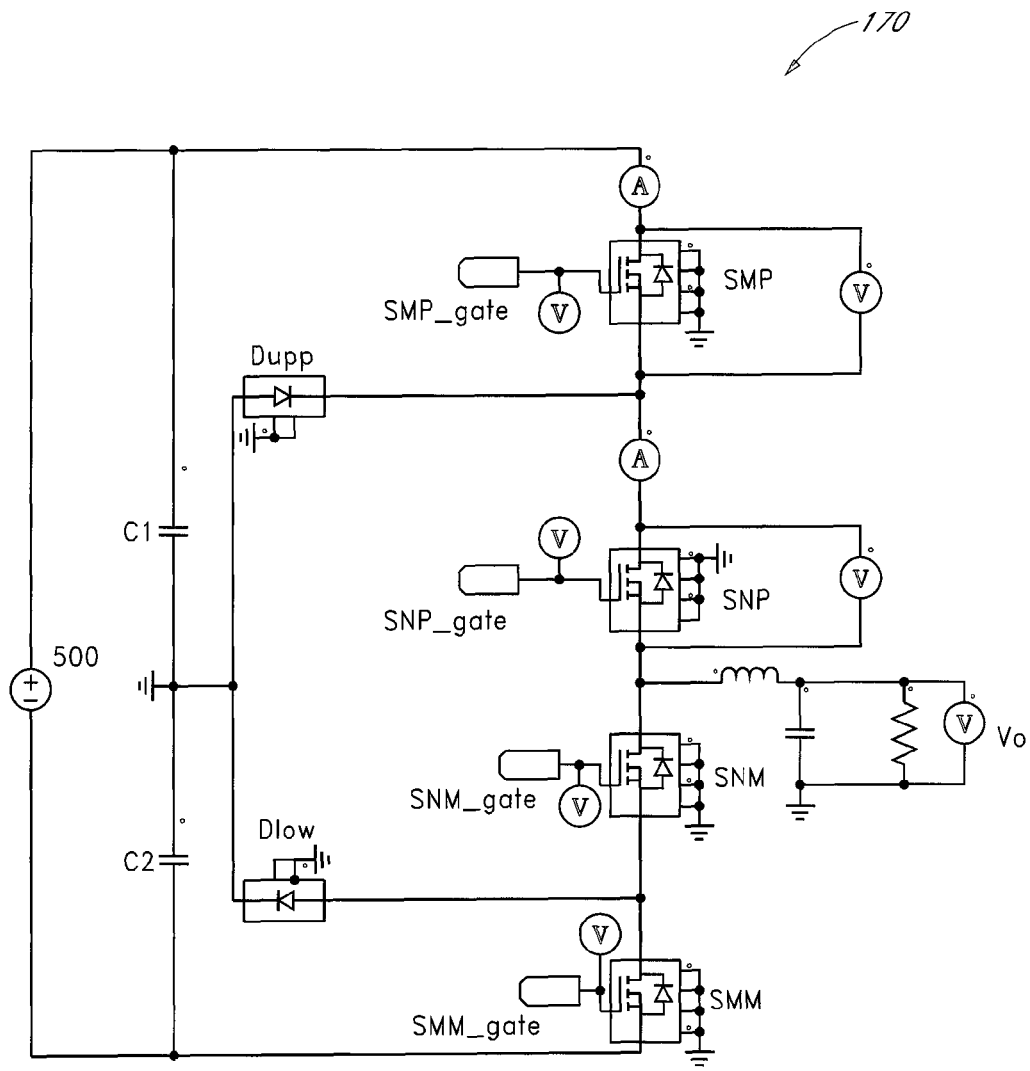
FIG. 6 is a schematic diagram of the multilevel inverter circuit of FIG. 3 as simulated in accordance with an embodiment of the present invention.

FIG. 6 is a schematic diagram of the multilevel inverter circuit 170 (see FIG. 3) as simulated using the PSIM v. 9.0 circuit simulation software, commercially available from Powersim, Inc. In the example of FIG. 6, the multilevel inverter circuit 170 receives input from a 500 V DC source across the capacitors C1 and C2. The main and neutral switches comprise MOS transistors in the simulation. The main and neutral switches are driven with control pulses that have a dead time that varies from zero to 1 micro seconds.

Figure 7:
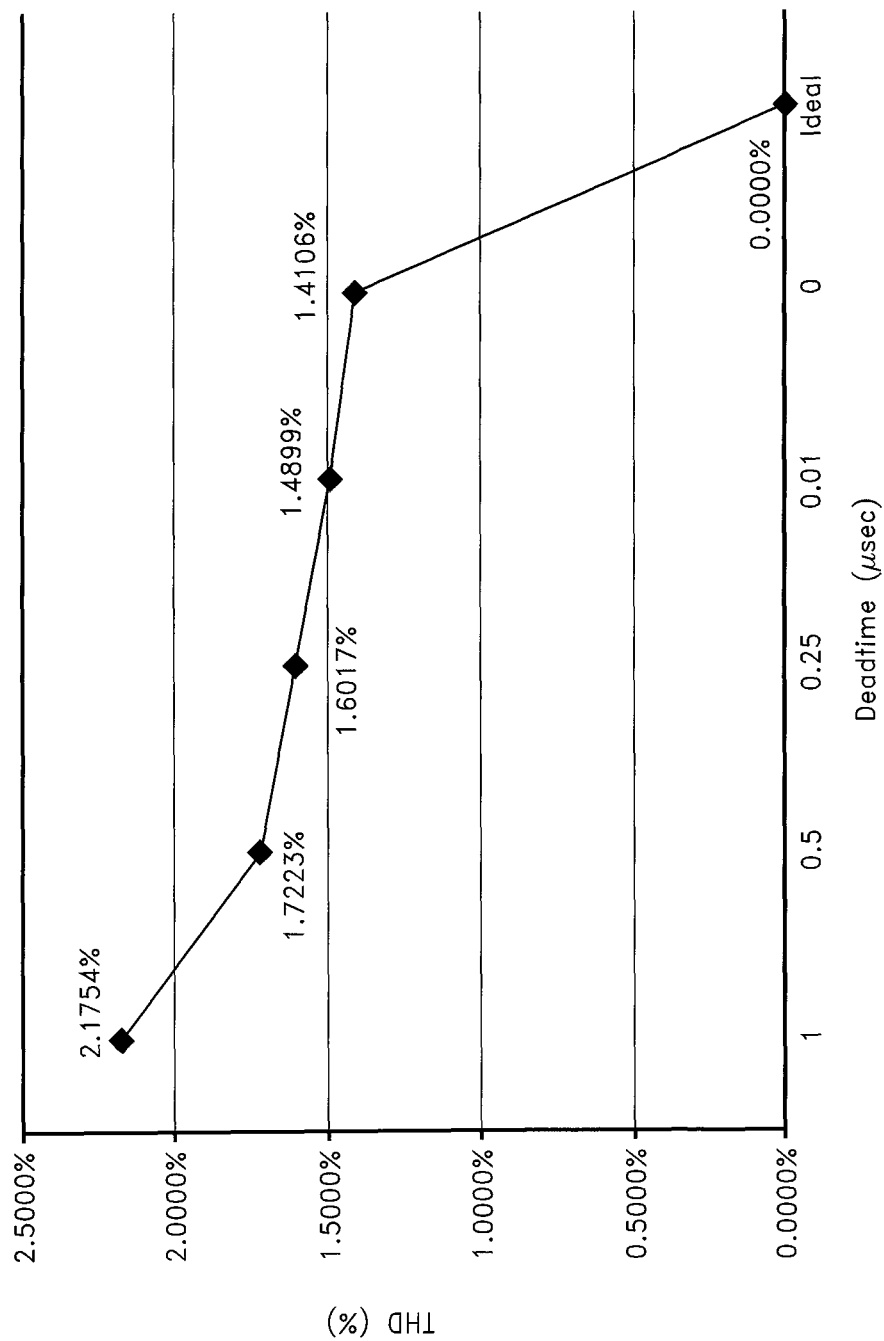
FIG. 7 is a graph showing the results of the simulation of the multilevel inverter circuit of FIG. 6.
Figure 9:
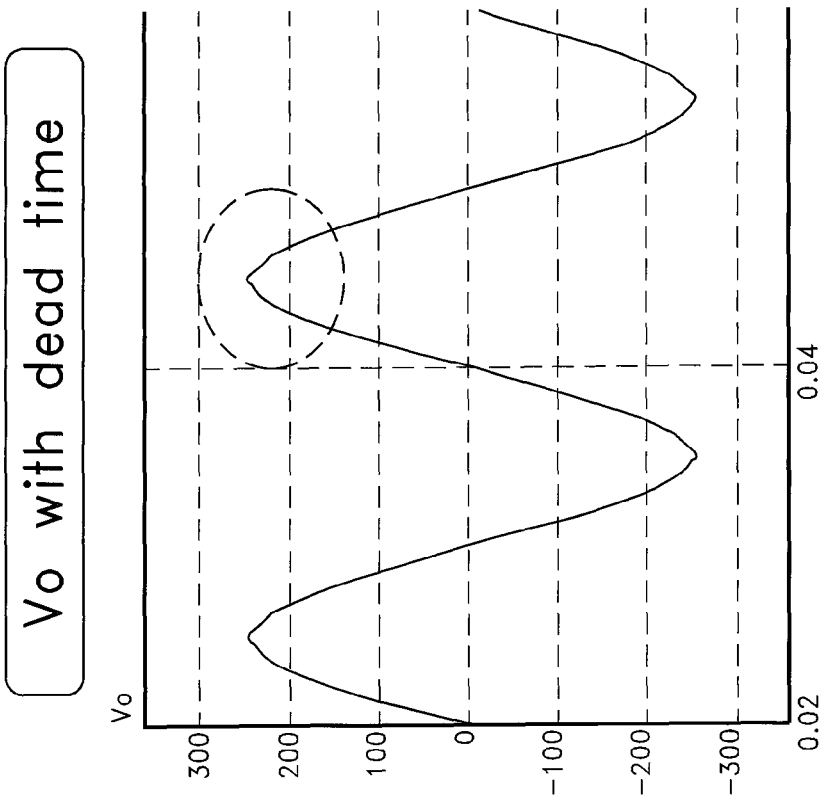
FIG. 9 shows a waveform of the AC voltage output of the multilevel inverter circuit of FIG. 6 in the non-ideal case where dead time is inserted in the simulation.
Figure 8:
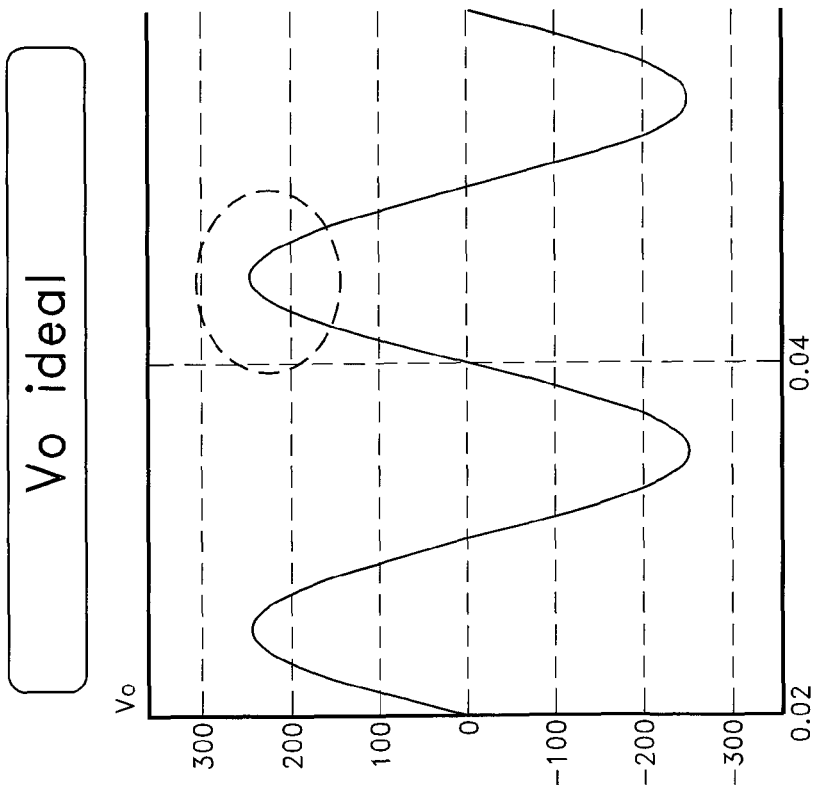
FIG. 8 shows a waveform of the AC voltage output of the multilevel inverter circuit of FIG. 6 in the ideal case where dead time is zero in the simulation.

FIG. 7 is a graph showing the results of the simulation. In the graph of FIG. 7, the vertical axis represents total harmonic distortion in percent, and the horizontal axis represents dead time in micro seconds. As shown in FIG. 7, the total harmonic distortion of the sinusoidal AC voltage output Vo decreases as dead time is eliminated in accordance with the current vector controlled dead time disclosed herein. FIG. 7 shows a waveform of the AC voltage output Vo in the ideal case where dead time is zero in the simulation. FIG. 9 shows a waveform of the AC voltage output Vo with some dead time in the simulation. As can be seen from the dashed portions of FIGS. 8 and 9, the increased total harmonic distortion with dead time distorts the peak of the sinusoidal AC voltage output Vo in the non-ideal case (see FIG. 9). Eliminating dead time as disclosed herein thus advantageously improves the total harmonic distortion of a multilevel inverter.

Electrical circuits and methods for current vector controlled dead time for multilevel inverters have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of operating a multilevel inverter circuit, the method comprising:
   modulating a first main switch and a first neutral switch during generation of a positive half cycle of an output of the multilevel inverter circuit, the first main switch switching on and off to connect and disconnect an output node of the multilevel inverter circuit to a positive node, the first neutral switch switching on and off to connect and disconnect the output node of the multilevel inverter circuit to a neutral potential;
   detecting a flow direction of alternating current (AC) current output of the multilevel inverter circuit; and
   in response to detecting that the AC current output of the multilevel inverter is flowing in a positive direction towards a load, eliminating dead time between switching of the first neutral switch and the first main switch during the generation of the positive half cycle of the output of the multilevel inverter circuit.

2. The method of claim 1 wherein the first neutral switch is continuously turned off during a first period when the AC current output of the multilevel inverter is flowing in the positive direction towards the load during generation of the positive half cycle of the output of the multilevel inverter circuit.

3. The method of claim 1 further comprising:
   modulating a second main switch and a second neutral switch during generation of a negative half cycle of the output of the multilevel inverter circuit, the second main switch switching on and off to connect and disconnect the output node of the multilevel inverter circuit to a minus node, the second neutral switch switching on and off to connect and disconnect the output node of the multilevel inverter circuit to the neutral potential; and
   in response to detecting that the AC current output of the multilevel inverter is flowing in a negative direction away from a load towards the multilevel inverter circuit, eliminating dead time between switching of the second neutral switch and the second main switch during the generation of the negative half cycle of the output of the multilevel inverter circuit.

4. The method of claim 3 wherein the second neutral switch is continuously turned off during a second period when the AC current output of the multilevel inverter is flowing in the negative direction away from the load towards the multilevel inverter circuit during generation of the negative half cycle of the output of the multilevel inverter circuit.

5. The method of claim 3 further comprising:
   during the generation of the positive half cycle of the output of the multilevel inverter circuit at a time when the AC current output of the multilevel inverter is flowing in the negative direction away from the load towards the multilevel inverter circuit, inserting dead time between switching of the first neutral switch and the first main switch.

6. The method of claim 5 further comprising:
   during the generation of the negative half cycle of the output of the multilevel inverter circuit at a time when the AC current output of the multilevel inverter is flowing in the positive direction towards the load, inserting dead time between switching of the second neutral switch and the second main switch.

7. The method of claim 1 further comprising:
   providing a positive voltage of a first capacitor on the positive node; and
   providing a negative voltage of a second capacitor on the minus node, wherein the neutral node is between terminals of the first and second capacitors.

8. The method of claim 7 further comprising:
   charging the first and second capacitors using a power factor correction (PFC) circuit.

9. The method of claim 3 further comprising:
   providing a positive voltage on the positive node, a negative voltage on the minus node, and a neutral potential on the neutral node using a plurality of solar cells.

10. A method of operating a multilevel inverter circuit, the method comprising:
    generating a first half cycle of an alternating current (AC) voltage output of the multilevel inverter circuit;
    detecting a flow direction of AC current output of the multilevel inverter circuit; and
    eliminating dead time between switching of a first neutral switch and a first main switch of the multilevel inverter circuit during generation of the first half cycle of the AC voltage output based on the flow direction of the AC current output of the multilevel inverter circuit.

11. The method of claim 10 further comprising:
    detecting that the AC current output is flowing in a positive direction towards a load during the generation of the positive half cycle of the AC voltage output in a first time period, and wherein the dead time between switching of the first neutral switch and the first main switch is eliminated during the first time period.

12. The method of claim 11 further comprising:
    maintaining the first neutral switch continuously off during the first time period.

13. The method of claim 11 further comprising:
    inserting dead time between switching of the first neutral switch and the first main switch in a time period just before the first time period.

14. The method of claim 11 further comprising:
    detecting that the AC current output is flowing in a negative direction away from the load and towards the multilevel inverter circuit during generation of a negative half cycle of the AC voltage output of the multilevel inverter circuit in a second time period; and
    eliminating dead time between switching of a second neutral switch and a second main switch of the multilevel inverter circuit during the second time period.

15. The method of claim 14 further comprising:
    inserting dead time between switching of the second neutral switch and the second main switch in a time period just before the second time period.

16. The method of claim 14 further comprising:
    maintaining the second neutral switch continuously off during the second time period.

17. A multilevel inverter circuit comprising:
    a main positive switch coupled to a positive voltage source;
    a main minus switch coupled to a negative voltage source;
    a neutral positive switch coupled to a neutral potential and the main positive switch;
    a neutral minus switch coupled to the neutral potential and the main minus switch; and
    an inverter control circuit having control outputs coupled to the main positive switch, the main minus switch, the neutral positive switch, and the neutral minus switch and having an input coupled to receive current vector information indicating direction of flow of an AC current output of the multilevel inverter circuit, the inverter control circuit being configured to remove dead time between switching of the neutral minus switch and the main positive switch and between switching of the neutral positive switch and the main minus switch based on the current vector information.

18. The multilevel inverter circuit of claim 17 wherein the main positive switch, the main minus switch, the neutral positive switch, and the neutral minus switch comprise metal oxide semiconductor (MOS) transistors.

19. The multilevel inverter circuit of claim 17 further comprising a first capacitor providing the positive voltage source and a second capacitor providing the negative voltage source.

20. The multilevel inverter circuit claim 19 wherein the first capacitor and the second capacitor are charged by a power factor correction (PFC) circuit.

* * * * *